United States Patent [19]
Klinker

[11] Patent Number: 5,590,271
[45] Date of Patent: Dec. 31, 1996

[54] INTERACTIVE VISUALIZATION ENVIRONMENT WITH IMPROVED VISUAL PROGRAMMING INTERFACE

[75] Inventor: Gudrun J. Klinker, Westborough, Mass.

[73] Assignee: Digital Equipment Corporation, Maynard, Mass.

[21] Appl. No.: 585,810

[22] Filed: Jan. 16, 1996

Related U.S. Application Data

[63] Continuation of Ser. No. 66,187, May 21, 1993, abandoned.

[51] Int. Cl.⁶ ............................................. G06F 3/00
[52] U.S. Cl. ..................... 395/326; 395/348; 395/967
[58] Field of Search ................................ 395/155, 161, 395/159, 160, 156, 157, 118, 119; 364/188, 190, 191

[56] References Cited

U.S. PATENT DOCUMENTS

| | | | |
|---|---|---|---|
| 4,812,996 | 3/1989 | Stubbs | 395/156 X |
| 4,910,691 | 3/1990 | Skeirik | 395/11 |
| 5,155,836 | 10/1992 | Jordan et al. | 395/500 |
| 5,291,587 | 3/1994 | Kodosky et al. | 395/157 X |
| 5,355,062 | 10/1994 | Takizawa et al. | 395/159 X |
| 5,388,264 | 2/1995 | Tobias, II et al. | 395/159 X |
| 5,390,138 | 2/1995 | Milne et al. | 395/155 X |
| 5,392,207 | 2/1995 | Wilson et al. | 395/159 X |
| 5,490,246 | 2/1996 | Brotsky et al. | 395/161 |

OTHER PUBLICATIONS

Williams et al, "A Visual Language for Image Processing," Proceedings of the 1990 IEEE Workshop on Visual Languages, pp. 86–91.

Upson et al., *The Application Visualization System: A Computational Environment for Scientific Visualization*, IEEE Computer Graphics & Applications (1989), pp. 30–42.

Upson et al., *Future Directions of Visualization Software Environments*, Siggraph 91 Panel Proceedings, Association for Computing Machinery, Inc. (1992), pp. 7–1, to 7–15.

*Primary Examiner*—Raymond J. Bayerl
*Assistant Examiner*—Crescelle N. dela Torre
*Attorney, Agent, or Firm*—Cesari and McKenna'

[57] ABSTRACT

A feedback channel connects an interactive display module to other independent program modules of a data network to provide a visual programming interface on a computer screen that facilitates user interaction with data displayed on the screen. A logbook record structure contains state information relating to the data, i.e., descriptive information about the data, as well as transformations that have been applied to it. The logbook record is accessed and manipulated in a manner that decentralizes the state information, thereby enabling that information to "flow" with the data through the dataflow network.

The program modules record, apply and reverse the transformations by performing operations on the logbook record.

17 Claims, 7 Drawing Sheets

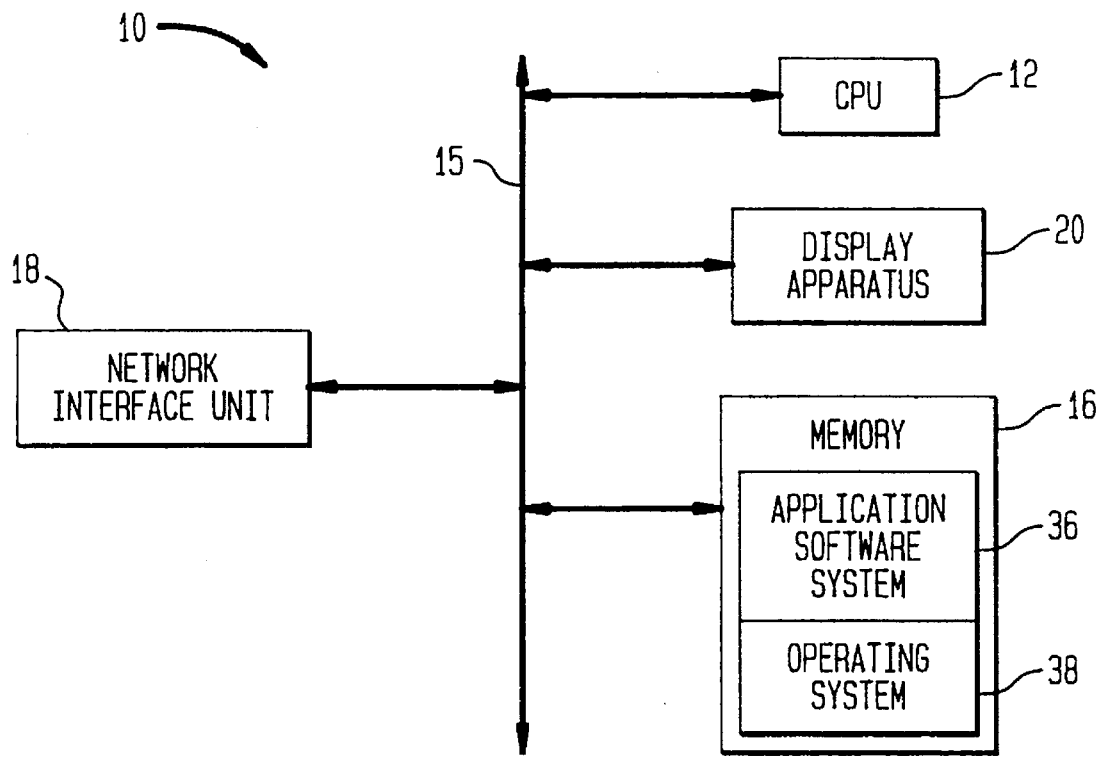
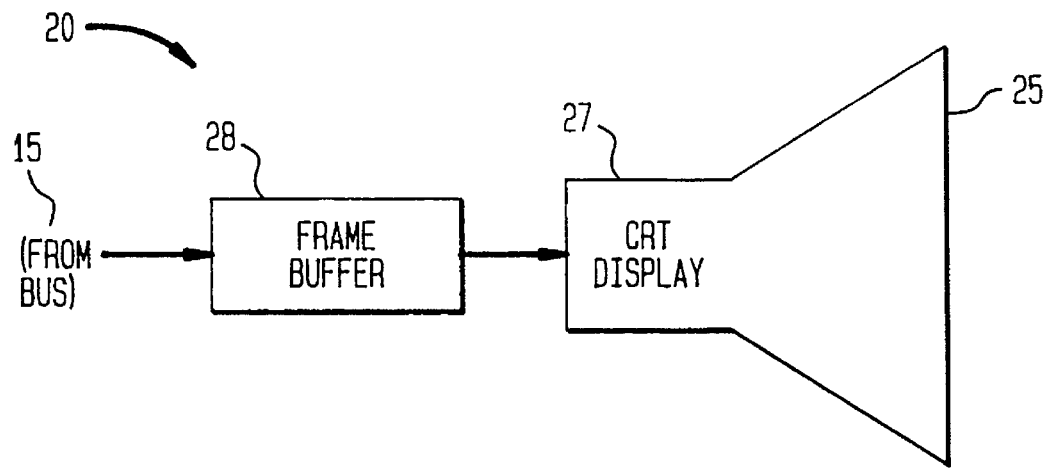

INTERACTIVE VISUALIZATION ENVIRONMENT WITH IMPROVED VISUAL PROGRAMMING INTERFACE

RELATED APPLICATIONS

This application is a file wrapper continuation application (FWC) of application Ser. No. 08/066,187, filed May 21, 1993, entitled "Interactive Visualization Environment With Improved Visual Programming Interface," now abandoned.

FIELD OF THE INVENTION

This invention relates generally to visualization environments and, more specifically, to an interactive visualization environment having an improved visual programming interface.

BACKGROUND OF THE INVENTION

In the field of computational research, events are abstractions which are typically based upon physical phenomena. Researchers may gain access to these events through mathematical, numerical, textual or graphical techniques. Although each of these techniques augments the perspectives brought to bear on an event, each has its advantages and disadvantages when conveying information.

Comprehension of information results from the interplay and juxtaposition of these various techniques. That is, the juxtaposition of graphical, textual and numerical techniques gives the researchers graduated access to their data. It is for this reason that visualization, i.e., the use of visual forms to represent information, has emerged as a desirable environment with which to effectively convey information.

Some general-purpose visualization systems include visual programming interfaces for researchers/users to create their own visualization environments from a library of program modules. A program module is a software-coded process consisting of a sequence of operations that are organized to produce a specified result. The visual programming interfaces contain graphical tools for users to interactively assemble the modules into dataflow networks of communication processes so that the users may visualize their data. That is, an output port of one module may be connected to the input port of another module so that when data flows between the modules, the latter module's operations are performed. A typical network may thus include a series of interconnected module stages that are configured to read data from an image, process that data, e.g., apply a transformation to the data, and then display the data on a computer screen.

Despite their flexiblity towards customizing networks, the general-purpose systems are not well suited for data exploration because they lack essential interactive capabilites. For example, user interaction is typically limited to means for displaying the data without any means for interactively manipulating the data at various stages of the network. As a result, data can only be visualized.

Yet, users often need to explore, rather than merely visualize, their data, particularly for applications involving analysis of empirical data. To fully analyze their data, users typically need to probe the value of individual data elements and apply special procedures to a small region-of-interest, e.g., compute the mean data value of a subset of data elements. Users may also want to visualize relationships between these data elements in several images or volumes which may span several windows of a computer display. The contents of these windows may be manipulated, e.g., moved around and made smaller or larger, and thereafter transferred to other users so that customized "views" of these relationships can be exchanged.

Conventional systems, such as teleradiology systems, provide telecommunication capabilities for users to access images remotely, e.g., at their personal computers, and from a centrally-located computer. With these systems, users can simultaneously view and annotate the images at their respective locations, and then exchange their diagnosis over the telephone. However, these telecommunication systems do not have interactive tools, such as linked cursors, for users to collaboratively annotate the data.

Data probing and cursor linking have traditionally been provided by closed visualization systems with special-purpose program modules that address specific data processing and visualization applications. Because of their "special-purpose" design, these systems have limited capabilities. Specifically, the program modules have limited functionality which cannot be easily and efficiently extended because user interaction is limited by the system's visual programming interface tools. The lack of user interaction precludes integration of the special-purpose modules with open modules of general-purpose visualization systems.

Moreover, maintenance of "state" information relating to the displayed data, e.g., the data types displayed on each window and the sizes of those windows displaying the data types, is a significant issue. Because each independent module of the network may alter the data displayed on the screen, maintaining the state information at a centralized location with a global data structure is complicated and requires significant processing overhead.

Therefore, it is among the objects of the invention to provide enhanced user interaction capabilities that facilitate customizing of users' visualization environments.

Another object of the invention is to provide data visualization and exploration mechanisms for developing telecollaboration systems.

SUMMARY OF THE INVENTION

The invention resides in a method and apparatus for enhancing user interaction of data images displayed on a computer screen by way of an improved visualization environment. A novel feedback channel connects an interactive display program module to other independent program modules of a dataflow network to provide a visual programming interface to the computer screen that facilitates user interaction with the independent modules. In general, the improved visual programming interface facilitates interactive data exploration techniques such as (i) probing of selected data and defining of regions-of-interest; (ii) transforming selected data and displaying that data in a variety of ways; (iii) establishing linked cursors between windows of computer screens that show the data with arbitrary relationships; (iv) displaying data on screens across a computer network; and (v) extending the functionality of the dataflow network by interchanging modules.

The features described herein are exploited through use of the feedback channel and a novel logbook record structure that contains state information relating to the data, i.e., descriptive information about the data, as well as transformations that have been applied to it. In accordance with the invention, the logbook record is accessed and manipulated in a manner that decentralizes the state information, thereby enabling that information to "flow" with the data through the dataflow network. In other words, each module can record, in the logbook record, changes it makes to the data or forward a record of those changes to a next module in the dataflow network. A set of operations associated with the logbook record are provided for the program modules to record, apply and reverse the transformations.

Specifically, the feedback and logbook mechanisms facilitate data interpretation and exploration by providing user interaction parameters directly to the network modules through cursor positioning events. For example, when receiving a cursor positioning event from the display module via the feedback channel, an independent program module accesses the logbook record to relate the window position of an image to the correct pixel position in the original data. Users may interactively select pixels on windows, perform arbitrary operations on them, and redisplay them in different ways. The selected pixels can be cross-linked between data sets of various windows.

The mechanisms of the invention also provide a foundation for flexible tele-collaboration arrangements across computer networks. By linking cursors between windows, similar data images may be simultaneously displayed on remotely-connected computer screens and the users at those computers may independently annotate the data. The novel display module described herein adapts its display mechanism to the capabilities of the computers' respective frame buffers.

Moreover, data presentation tools are provided to extract and merge selected dimensions from data sets, and thereafter to map the selected dimensions onto display devices. The display module is configured to display both array data and geometric data, overlaying geometric data on the images. As a result, users can merge information from several sources, as well as apportion information from a single entity into several partial views, mixing and matching data of different data types.

BRIEF DESCRIPTION OF THE DRAWINGS

The above and further advantages of the invention may be better understood by referring to the following description in conjunction with the accompanying drawings, in which:

FIG. 1 is a diagram of a computer for executing the improved visual programming interface in accordance with the invention;

FIG. 2 is a diagram of a computer display unit of the computer of FIG. 1;

DETAILED DESCRIPTION OF ILLUSTRATIVE EMBODIMENTS

Figure 3:
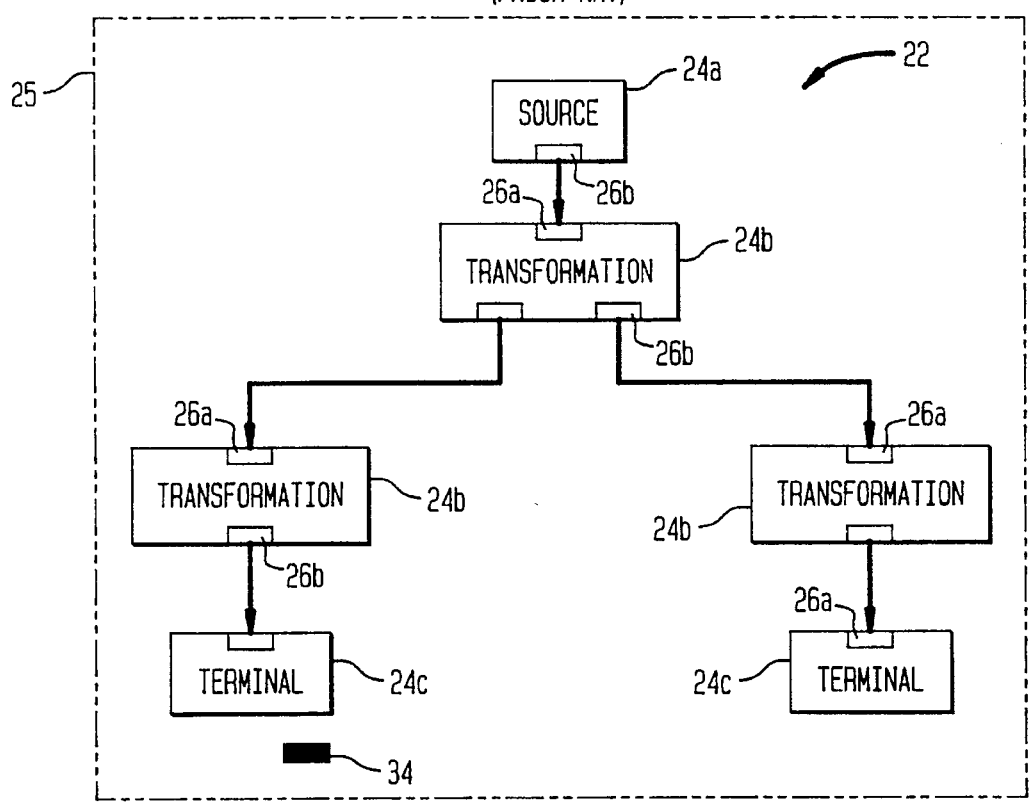
FIG. 3 is a diagram of a conventional dataflow network displayed on the unit of FIG. 2.

FIG. 1 is a diagram of a typical computer 10 for executing the improved visual programming interface in accordance with the invention. The computer 10 includes a central processing unit (CPU) 12, a computer display unit 20, a main memory 16 and a network interface unit 18, all interconnected by a system bus 15.

FIG. 2 is a diagram of the computer display unit 20, which preferably includes a raster cathode ray tube (CRT) 27 for scanning an image onto a screen 25 at a predetermined refresh rate. The image is composed of a matrix of picture elements, i.e., pixel data, which may be digitally represented as a "pixel map". A frame buffer 28 stores the pixel map and thereafter provides it to the CRT 27 at the refresh rate when displaying the image on the screen 25. Specifically, the CPU 12 performs read and write operations in the frame buffer 28 to manipulate the image displayed on the screen 25, e.g., by moving a cursor 34 (FIG. 4) on a display window.

An operating system 38, portions of which are typically resident in main memory 16 and executed by the CPU 12, functionally organizes the computer to invoke operations in support of an application software system 36 being executed by the computer 10. The improved visual programming interface described herein is built upon an application software system 36 that provides a framework for interconnecting independent software program modules into an executable dataflow network. The software modules typically reside in the main memory 16 and are accessable at specific memory address locations. An example of such a system is the Application Visualization System (AVS), described in an article titled, *The Application Visualization System: A Computational Environment for Scientific Visualization*, by Upson et al., 1989 IEEE Computer Graphics and Applications, which article is incorporated by reference as though fully set forth herein.

The AVS system is implemented using a conventional X Window System, which includes a device driver program, i.e., X-server, configured to operate with the frame buffer 28. Frame buffers typically have display capabilities, e.g., screen sizes and bits per pixel, that vary from buffer to buffer. Application software systems, such as AVS, communicate with the X-server by exchanging requests, either locally within a computer or remotely over a computer network. Specifically, the application system sends graphical drawing and display requests to an X-server, which responds with descriptive information about its frame buffer. The application system then adapts its pixel data to the frame buffer capabilites, e.g., reducing 24-bit per pixel color images to 8-bits per pixel, and forwards the data to the server, which applies it to, e.g., an 8-bit frame buffer.

Generally, the application software system 36 includes a flow executive component that determines when to execute the software modules and a diagram editor component for displaying a diagram of the module network on the computer screen 25. An example of a conventional dataflow network 22 displayed on the screen 25 is shown in FIG. 3. The diagram serves both as the means of constructing a dataflow network of interconnected modules 24 from a menu of those modules and as a map for illustrating its execution. The software modules 24 of the system process data to perform specific visualization operations. Parameters that control a module's computations are provided through graphical control panels or peripheral input devices, e.g., a mouse (not shown), of the user interface.

Each module 24 is defined by a template file and a name, its input and output data types and the parameters that can be accessed from a user interface. The input and output data types may be represented by arguments based on the definition in the template. As an example, assume a module 24 incorporates a transformation procedure for returning a 2-dimensional (2D) slice of a 3D scalar field. The module is defined to have a 3D scalar field as its input and a 2D scalar field as its output. It would declare one parameter for determining which slice to return and would implement a procedure for accepting a 3D array of floating-point numbers and entering a 2D array with the return value.

Modules 24 of the dataflow network 22 process data in response to requests by modules connected "downstream", i.e., connected to output ports of the modules, in the network. The independent program modules 24 are characterized by their input and output port connections as follows:

(i) Source modules are modules 24a having no "upstream" input ports, but having at least one downstream output port. These modules are typically data-access programs.

(ii) Transformation modules are modules 24b that typically have a plurality of input and output ports. These modules are configured to provide data transformation functions, such as filtering, e.g., interpolations, scaling, and warping; geometric mapping, e.g., contour and surface generators; rendering and volume rendering.

(iii) Terminal modules are modules 24c having at least one input port and no downstream output ports. These modules typically display the processing results of the network.

Operationally, a user employs the diagram editor component to select modules by placing their respective icons in the flow network 22 displayed on the screen 25 with use of the cursor 34. Each module 24 appears as a box with connection pads symbolizing input and output ports 26. The cursor 34 is also used to connect modules by drawing lines between the connection pads. When connected modules are moved or deleted, a corresponding change is made to the lines.

Once the functional structure of the dataflow network 22 is constructed, the network is executed so that the user may interact with the application through the user interface. Specifically, a user interacts with the images displayed on the windows with the cursor 34 that is controlled by the input device.

The modules 24 communicate by exchanging data through their ports 26. Specifically, each output port 26b of a module 24 transmits a particular data type, while each input port 26a receives a particular data type. Data types are typically oriented toward scientific data manipulation and graphic display, including 1D, 2D, and 3D vectors of floating-point values, 2D and 3D grids with vectors of floating-point values at each grid point, geometric data and images, i.e., pixel maps.

Figure 4:
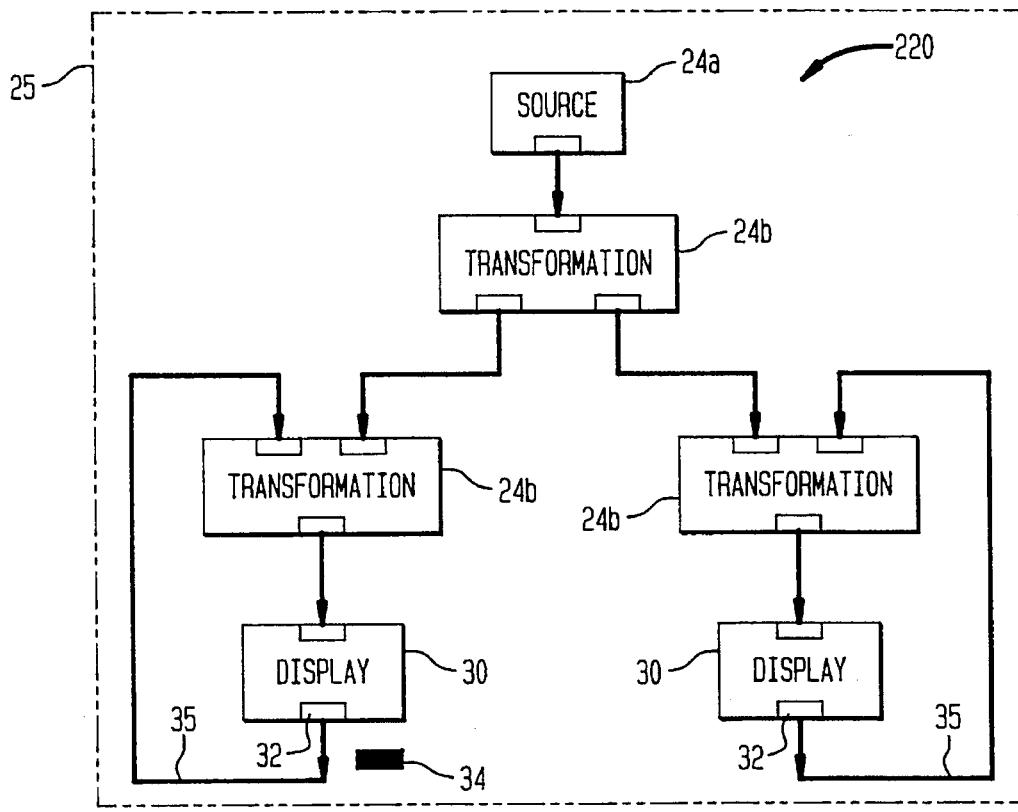
FIG. 4 is a diagram of a dataflow network having an interactive display module coupled to a feedback channel in accordance with the invention.

In accordance with an aspect of the invention, a terminal module of the type described above is provided with a downstream output port 32 to create an interactive display module capable of receiving parameters from a user. FIG. 4 shows the interactive display module 30 coupled to a feedback channel 35 that connects the display module to other independent program modules 24 of the dataflow network 220. This arrangement enables the user parameters, which are typically supplied through positioning events of the cursor 34, to be transferred from the display module 30 to the transformation modules 24b.

The interactive display module 30 may be created by modifying the software code of an existing terminal module to solicit the cursor positioning events as they occur on the screen 25 and providing additional code for transferring these events through an output port.

Transformation modules 24b of the dataflow network 220 alter the data they receive according to the functions they provide. The image that is ultimately displayed on the screen 25 has an intricate relationship to the data that was originally stored in the computer. When user-supplied parameters modifying this image are thereafter presented to program modules 24 of the network 220, each module requires information about this relationship so that it can relate the cursor positioning events in a window to an element in the original data set.

As an example, each pixel of a black-and-white image is defined by two geometric dimensions and one spectral dimension, i.e., a triple (x,y,i), to produce a 3D data set. When a 3D rotational transformation is applied to this image, the transformed image that is displayed on the screen undergoes a rotational procedure involving three axes that results in a complicated relationship between the displayed image data and the originally stored data. A program module that receives a subsequently-supplied user parameter that "probes" the displayed image by, e.g., selecting a particular pixel for amplification or "zooming", must first invert the rotational transformation to return to the original data set, select the correct pixel and then reapply the transformation.

Figure 5:
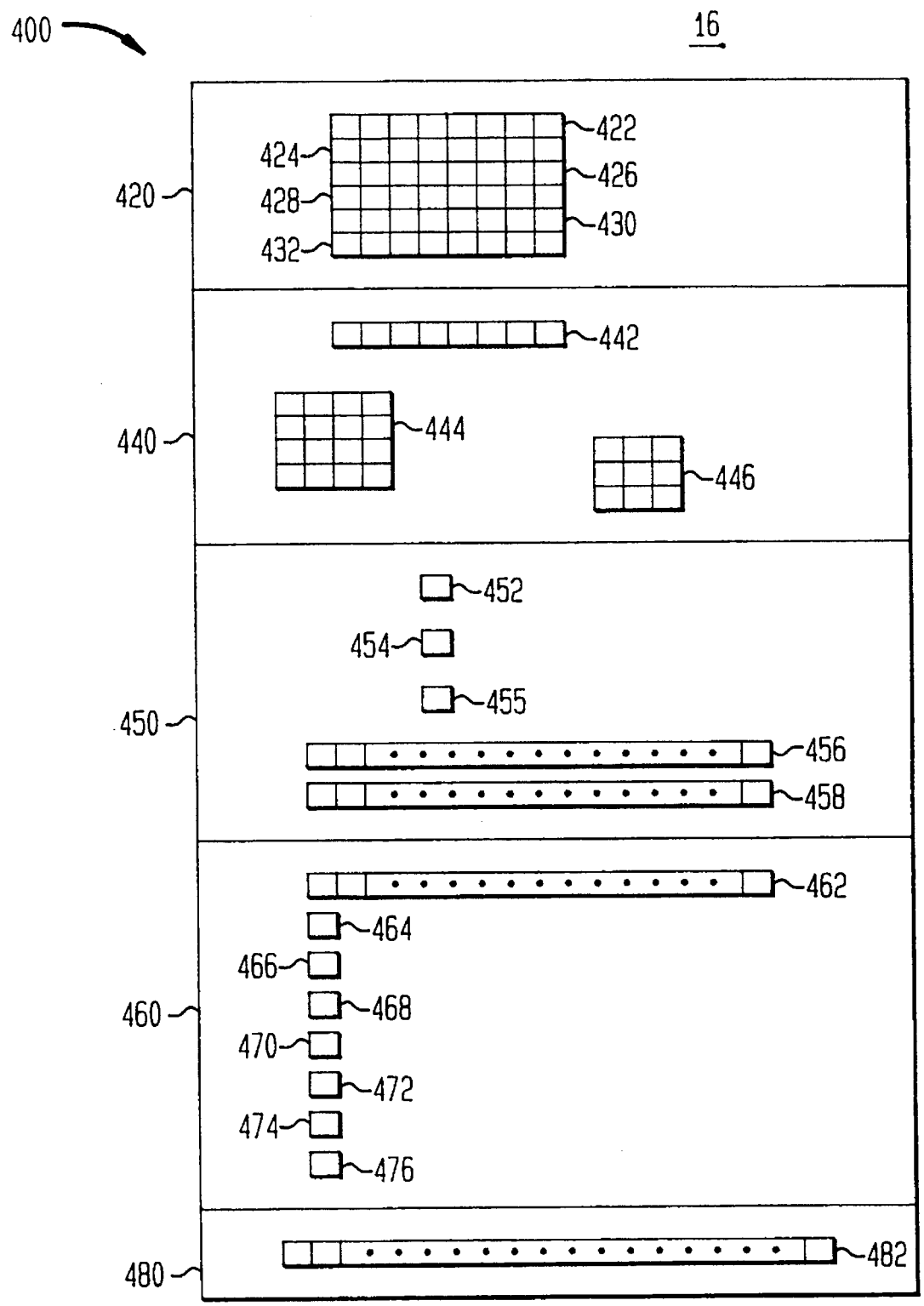
FIG. 5 depicts a format of a logbook record structure in accordance with the invention.

In accordance with another aspect of the invention, each module can record and update state information relating to the data, i.e., descriptive information about the data, as well as transformations that have been applied to it, in a novel logbook record structure. FIG. 5 illustrates a format of the logbook record 400. As described further herein, the logbook record 400 may be accessed and manipulated in a manner that decentralizes the state information, thereby enabling that information to "flow" with the data through the network 220 so that each program module 24 is aware of changes made to the data. In the illustrative embodiment of the invention, fields of the logbook record 400 contain the following structures and information:

(i) Vector field 420 for describing and defining the dimensions of a high-dimensional data set.

Vectors are contained in this field to store cropping information, i.e., vector 422, and subsampling information. i.e., 424, of multi-dimensional arrays. Vectors are also provided to store physical length of a dimension, i.e., vector 426, and virtual length of a dimension, i.e., vector 428. In addition, this field contains vectors for describing the "semantics" of each dimension of a data set, e.g., an axis type vector 430 and an axis label vector 432.

(ii) Vector and matrix field 440 for projecting high-dimensional data into lower-dimensional spaces.

This field includes a vector 442 for selecting a subset of dimensions from a high-dimensional data set. In addition, a homogeneous matrix 444 is included herein having sixteen (16) double-precision variables for projecting 3D data to 2D, as is a 2D-to-2D homogeneous matrix 446 having nine (9) double-precision variables for transforming two-dimensional data. It is to be noted that the logbook record defines a distinct 2D vector transformation to enable fast response time for probing image data.

(iii) Variable field 450 for describing the data.

This field includes a variable 452 for describing the minimal data value in a data set and, a variable 454 for the maximal value in a data set, a data type variable 455, a data set variable string 456 and a file name variable string 458. Each string has approximately 80 characters.

(iv) Variable field 460 for describing the display and the user-supplied parameters.

Variables in this field include a display name variable 462 (a string of characters) and variables describing user interaction events such as an event type variable 464, a window ID variable 466, an event time variable 468, an x_ position of mouse device variable 470, a y_ position of mouse device variable 472, a mouse device state variable 474 and a button/key variable 476, indicating the button or key that is depressed on an input device, such as a keyboard.

(v) A text string field 480 for modules to send additional information along with the data.

The logbook record 400 also includes a field having a placeholder for a text string 482 having up to 8000 characters for unanticipated communication. Thus, when a user sets a parameter in a particular module, the value can be passed along to other modules and the users do not have to maintain consistent parameter settings. For example, information about selected parameter values can be passed within the logbook record.

A set of operations associated with the logbook record 400 provides the program modules with routines to record, apply and reverse the transformations. Each module of the network that receives interactive user parameters is responsible for accessing the logbook record 400 to perform any or all of these operations.

Figure 6:
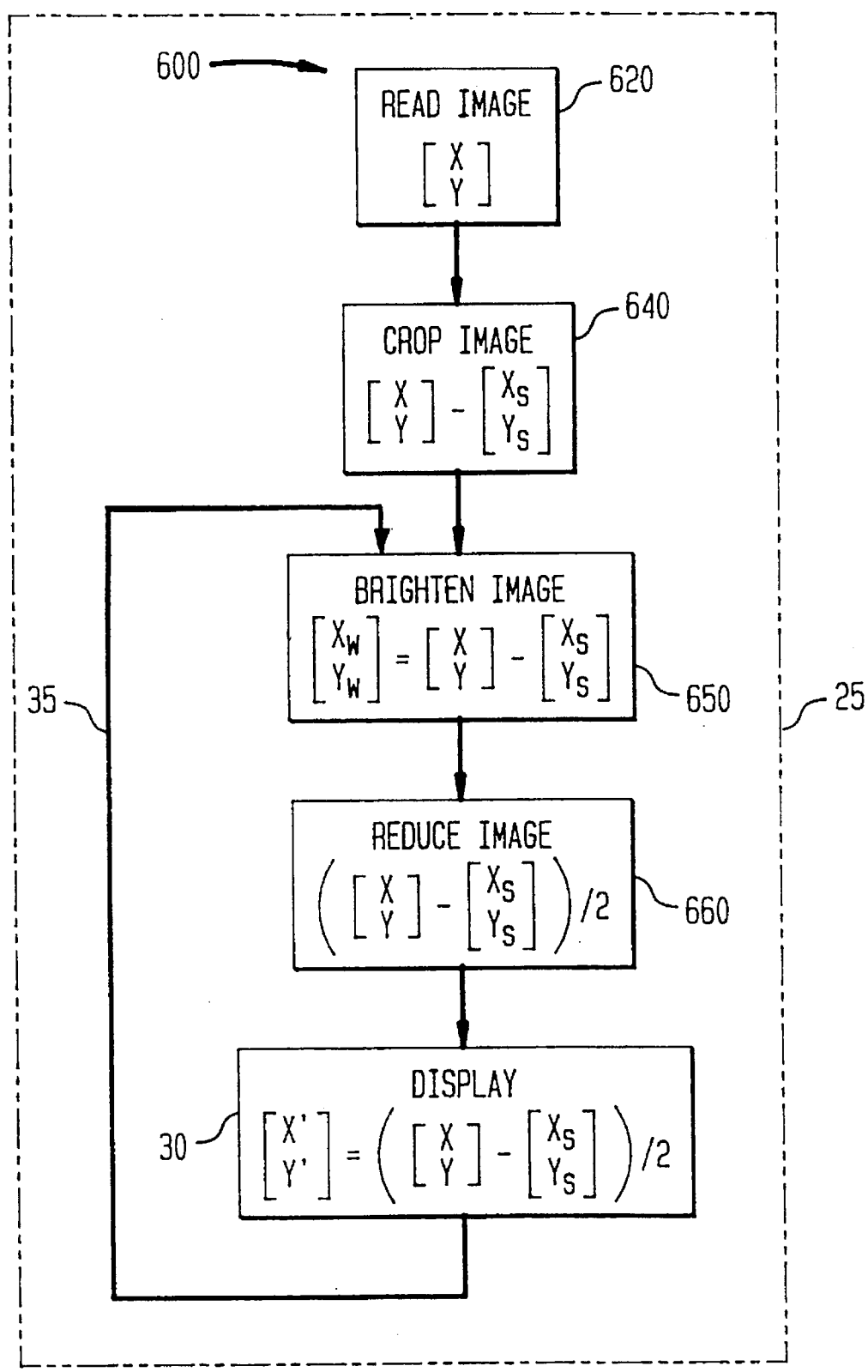
FIG. 6 shows a dataflow network in accordance with the invention.

For example, refer to FIG. 6, which shows a dataflow network 600 in accordance with the invention. A read image module 620 acquires a digital representation of a pixel of an image, i.e., a source image pixel [x,y], and initializes the logbook record 400 by entering information about the pixel in the record. The image pixel data is then forwarded to a image crop module 640, where the source image is "cropped" by [x—$x_s$,y—$y_s$]. The cropped transformation is then recorded in the logbook record 400 and the image data is forwarded to a brighten image module 650. This latter module 650 only modifies an image, i.e., brightens selected pixels, upon receiving user parameter inputs; therefore, the cropped image pixel [x—$x_s$,y—$y_s$] is passed to a reduce image module 660, where the image is reduced by a factor of two (2), i.e., ([x—$x_s$,y—$y_s$])/2. This latter operation performed on the data is recorded in the logbook record 400 and the image data is forwarded to the display module 30 for display as an output image.

A user selects the pixel [x',y'] in the displayed output image as a pixel for brightening. The display module 30 sends the position information, [x',y']=([x—$x_s$,y—$y_s$])/2, to the brighten image module 650 via the feedback channel 35. This latter module 650 uses the position information and the logbook record 400 to retrieve a corresponding pixel from the original source image data. The corresponding pixel is determined by inverting all geometric transformations that have been recorded in logbook record 400, e.g., by multiplying the user-selected pixel [x',y'] by 2 (this reverses the reduce image transformation) and then adding [$x_s$,$y_s$] to the quantity [x',y'] ×2 (this reverses the crop image transformation). Once determined, the corresponding pixel is brightened, [$x_w$,$y_w$], the "upper" transformations are reapplied, i.e., the crop image transformation is applied to obtain [$x_w$,$y_w$]=[x—$x_s$,y—$y_s$], and the image data is forwarded to the reduce image module 660.

As noted, each program module 24 is resident at addressable storage locations in main memory 16. The logbook record 400, which is allocated at initialization, is also resident in main memory 16 and is preferably implemented as a shared data structure that is configured to organize data elements relating to the displayed data image. Each module 24 of the application software system 36 may access the logbook record through its ports 26. In the illustrative embodiment of the invention, address pointers are provided to each of the modules 24 so that they may access the logbook record in memory 16 when recording or reading the state information as it flows with the data in the flow network 220. Alternatively, the contents of the logbook record may be copied from module to module.

Figure 7:
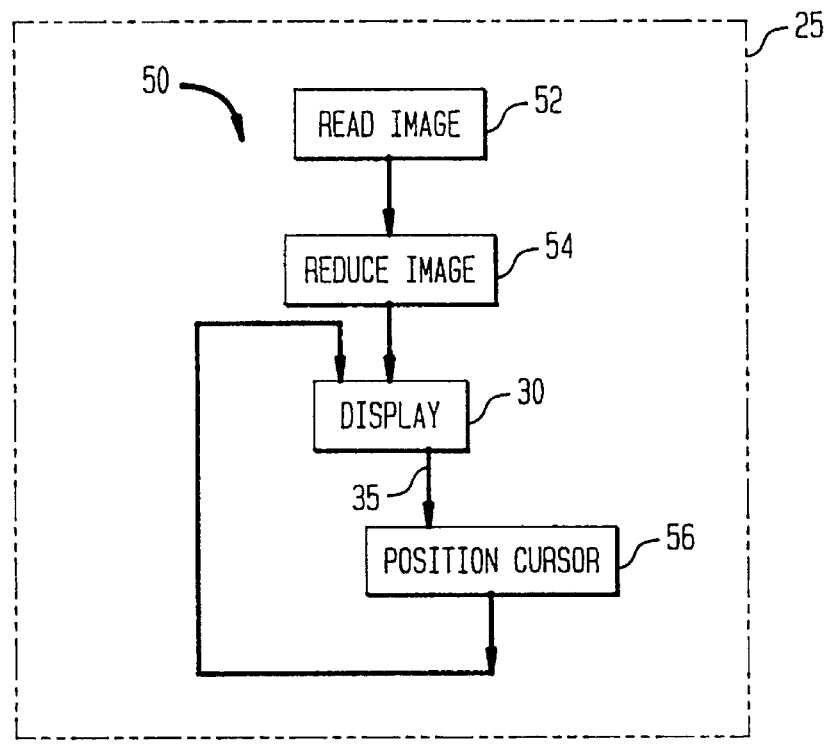
FIG. 7 depicts a flow network for data exploration/probing in accordance with the invention.

The feedback and logbook mechanisms of the invention interact to provide a visual programming interface that facilitates data interpretation and exploration by providing user parameters directly to the network modules through cursor positioning events. FIG. 7 depicts a flow network 50 for data exploration/probing in accordance with the invention. The network 50 consists of four modules, a read image module 52, a reduce image module 54, the display module 30 and a position cursor module 56 for overlaying a software-cursor on top of the displayed image. The read image module 52 reads an image of data and initializes the logbook record 400. The image data is then forwarded to the reduce image module 54 where the image is reduced, for example, by a factor of two (2). The operation performed on the data by this module 54 is recorded, e.g., in the subsampling vector 424 of logbook record 400 (FIG. 5).

The reduced image data is then passed to the display module 30 where the image is displayed. A user selects a pixel in the displayed image using, for example, a mouse device. The display module 30 sends that position information to the position cursor module 56 via the feedback channel 35. This latter module 56 uses the position and the logbook record 400 to retrieve a corresponding pixel from the original data set. As noted, the corresponding pixel is determined by inverting all geometric transformations that have been recorded in subsampling vector 424, e.g., by multiplying the values of the vector by two (2). The position cursor module 56 then sends geometric drawing commands describing the current cursor position back to the display module 30. Upon receiving the commands, the display module applies the same homogeneous transformations to the geometric data that were applied to the displayed image and thus overlays it at the correct position on the image.

Data Extraction

When mapped onto a specific display mechanism, a dimension of a data set typically needs to be adapted to the limited capabilities of the hardware. In particular, unbounded or high-precision dimensions of a data set need to be adjusted to the specified geometric and spectral ranges of the display device. These adjustments may include linear or non-linear scaling, subsampling or interpolation, and cropping or thresholding with a specified maximum and minimum value.

To ensure flexible mapping between the dimensions of a data set and the presentation capabilities of a display, mechanisms are needed for extracting "hyperspaces" from original data sets. The feedback and logbook mechanisms described herein provide tools for a user to extract data along certain dimensions, repackage that data, and then send it along to other modules capable of presenting the data in the desired style. Examples of projecting data onto hyperspaces include:

Data slicing along orthogonal or arbitrary directions

Elements are selected from a particular orthogonal or arbitrary slice through the data set. Non-orthogonal directions comprise linear combinations of several dimensions.

Possible extensions may allow non-linear combinations of dimensions, e.g., to define spherical projections.

Data accumulation with translucency

Elements are integrated along an arbitrary direction. If the data values are convolved with a translucency function, various structures in the data can be selectively emphasized. Possible extensions may allow multiplicative rather than additive accumulation schemes—which would be suitable for integrating probabilistic data sets. The data accumulation function may also take the position of a data element into account to provide depth cues.

Data histogramming

The elements are counted rather than integrated along a projection ray. For example, a color histogram of an image is a projection from five dimensions (x,y,r,g,b) to four dimensions, (r,g b,count), along dimensions x and y.

Data projection of extremal values

An element having a maximal or minimal value along the projection ray is selected.

Data projection of iso-surfaces

The first element with a value within a specified range is selected.

Data presentation

The mechanisms described herein also provide data presentation tools along different dimensions of display capabilities. The modules of a flow network may be mixed and merged such that users can generate detailed overlays which portray several presentation forms, both geometric and intensity-based, in a single view:

Intensity and color-based displays

An intensity image may be displayed having as many as four items of information per pixel, e.g., three geometric variables and one spectral variable (x,y,z,i). In contrast, a color image may include as many as six items per pixel, e.g., (x,y,z,r,g,b).

Graphs

As many as three values (x,y,i) may be plotted as unicolored lines or surfaces over a one- or a two-dimensional geometric base, i=f(x,y). More dimensions can be presented as families of graphs with different colors, line drawing styles or labels.

Icons

Icons may be arranged geometrically in one-, two- or three-dimensions. Their shapes can represent many variables.

Printed numbers

Printouts of high-dimensional data sets can be arranged as a long, sequential table, as two-dimensional arrangements of small blocks showing several data values per pixel, or as hybrids of the above.

Time

Figure 8:
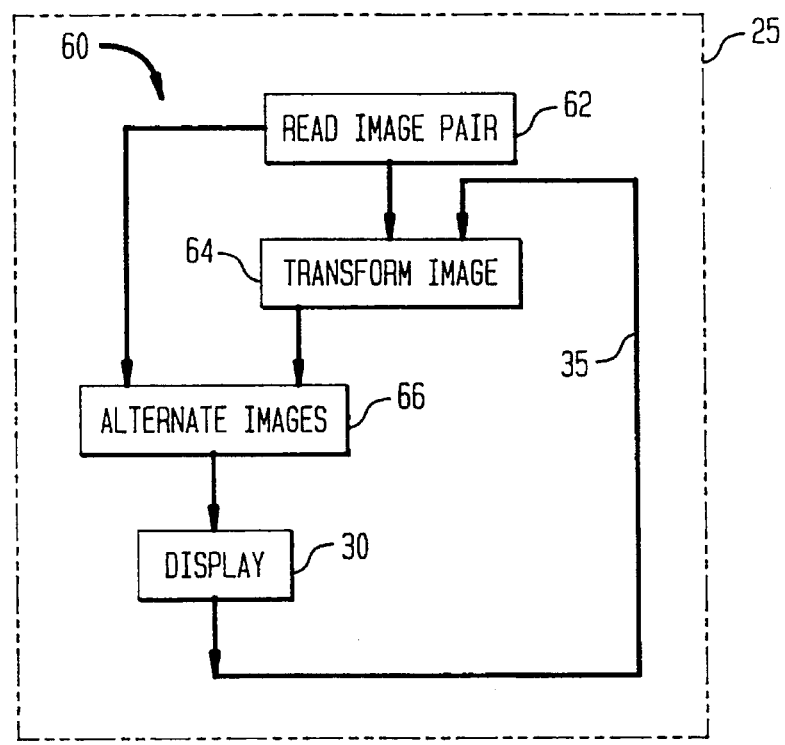
FIG. 8 depicts a representative flow network of a blink comparator for interactively aligning consecutive images.

The mechanisms described herein may be used to provide a blink comparator with which users can interactively align consecutive images. FIG. 8 depicts a blink comparator network 60 that includes a module 62 for reading a pair of images, a module 64 that applies a specific transformation to one of the images, an alternate module 66 that alternates rapidly between the two images, and the display module 30. Here, the feedback channel 35 is used to relay cursor movements indicating translation and rotation directions back to the transform module 64.

Interleaved dimensions

If additional geometric dimensions are needed to portray a data set, these dimensions may be interleaved by grouping a subset of the dimensions into blocks and therafter juxtaposing the blocks. Alternately, data can be merged on a pixel-by-pixel basis, enlarging each pixel position into a small n×n region.

Interactive Data Probing

Figure 9:
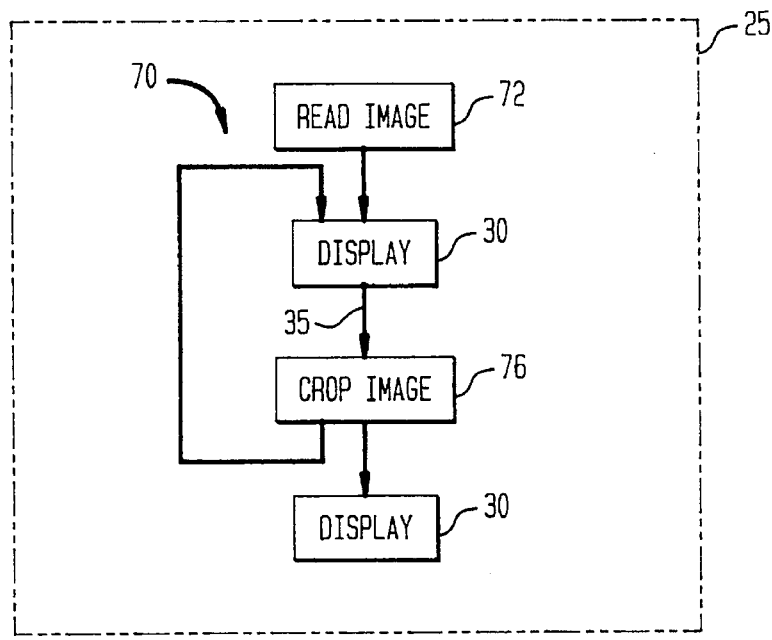
FIG. 9 is a diagram of a flow network for interactively formulating a region-of-interest data probing arrangement.

The feedback and logbook mechanisms provide users with a means for interactively formulating a region-of-interest data probing arrangement. FIG. 9 depicts a network 70 for creating a zoomed window of a portion of an image shown in an original window. After an image of data is read and displayed in the original window, the user selects a portion of the image to be probed using, for example, a mouse. The cursor position of the mouse is sent to a crop image module 76 from the display module 30 via the feedback channel 35. The crop image module 76 uses the position information as a center point of a rectangular area having a user-definable width and height. The cropped data is sent to a second display module 30 which generates the zoomed window. The data then is zoomed in this window via interactive window resizing.

Figure 10:
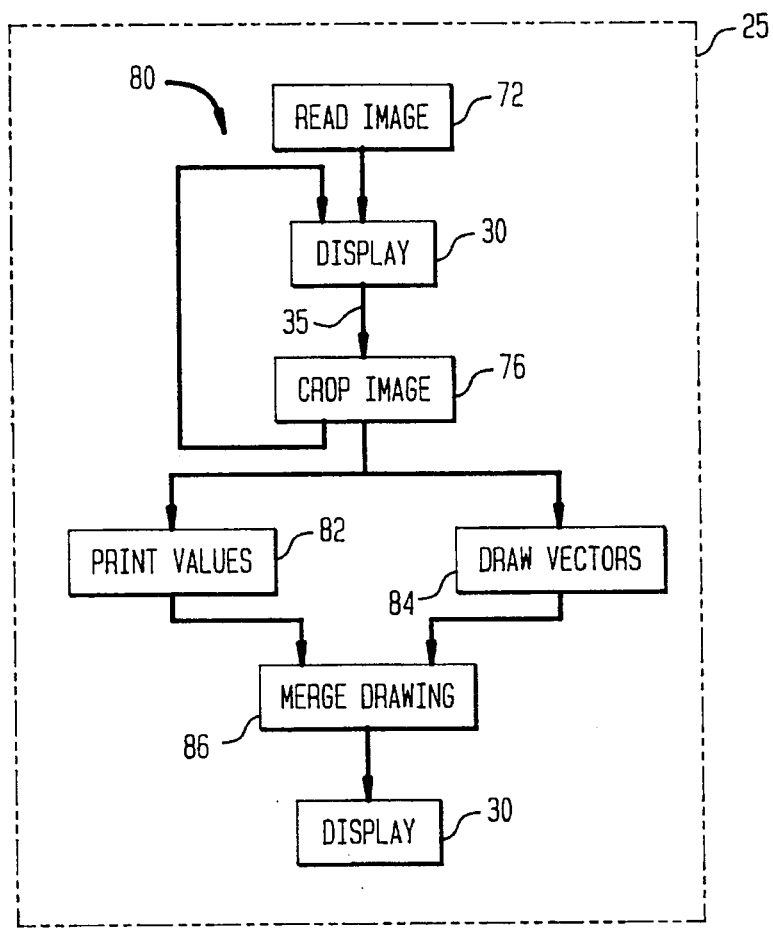
FIG. 10 depicts a flow network including the modules of FIG. 9 together with an additional level of functionality provided by the invention.

By extending the zooming and cropping network of FIG. 9, another level of functionality may be provided. FIG. 10 is a diagram of a network 80 that includes the modules of network 70 in addition to a module 82 for printing color pixel values and a module 84 for drawing normalized color vectors of each data element in the cropped image area. The outputs of these modules are merged at the merge drawing module 86 and thereafter overlaid on the zoomed image data, such that a detailed image is presented on the display screen 25.

In addition to 2D overlays on image data, users can also configure 3D viewing arrangements. Such a network would contain a module to specify the 3D viewing direction, a module for drawing the surface plot (draw terrain map) and a module for mapping the image data into the (x,y)-plane of the 3D coordinate system.

Cursor linking

The feedback channel 35 and logbook record 40 also provide a mechanism for linking cursors and overlaying these cursors on window screens to provide correspondence between the information displayed on the windows. Specifically, linking arrangements may be configured to portray relationships between different parts of data sets, e.g., the relationship between MR and CT data, and to visualize data in different presentation styles, e.g., as an image and as a terrain map.

In a typical cursor-linking arrangement, different parts of a data set are juxtaposed in several windows. Each window has its own software cursor to indicate the current position of interest in the window. The cursor in any window can be repositioned with a mouse and, in accordance with another aspect of the invention, cursor movement in one window is reflected in all windows. These links between windows may be established interactively using a network editor component of the application software system 36. Each displayed window corresponds to a different display module 30 in the flow network. When one of the modules interactively receives a mouse positioning event, the event is cross-fed to all display modules 30. The logbook record 400 ensures correct cursor positioning even if different windows show the data at different scale factors.

The cursor-linking mechanism can also be used to establish relationships between windows with various types of dimensions, such as to link an image to its histogram. In this case, a selected mouse position in the image does not translate directly into a position in the histogram. Instead, the data value at the pixel position is used as the index into the histogram. Accordingly, the mouse positioning information from the image window flows through a translation module which performs the necessary pixel lookup.

Tele-Collaboration

The display module 30 allows users to view their data on any display 20 which is connected to the computer network by specifying a display name parameter according to the naming conventions in X-Windows. Using this mechanism, data images can "migrate" between window displays on the computer network, i.e., data images can be initially displayed on a first screen and then moved to a second one. Window migration may be performed by establishing a connection between the application system 36 and the second screen in accordance with the description of X-server operation set forth above, and severing the connection to the first screen.

Figure 11:
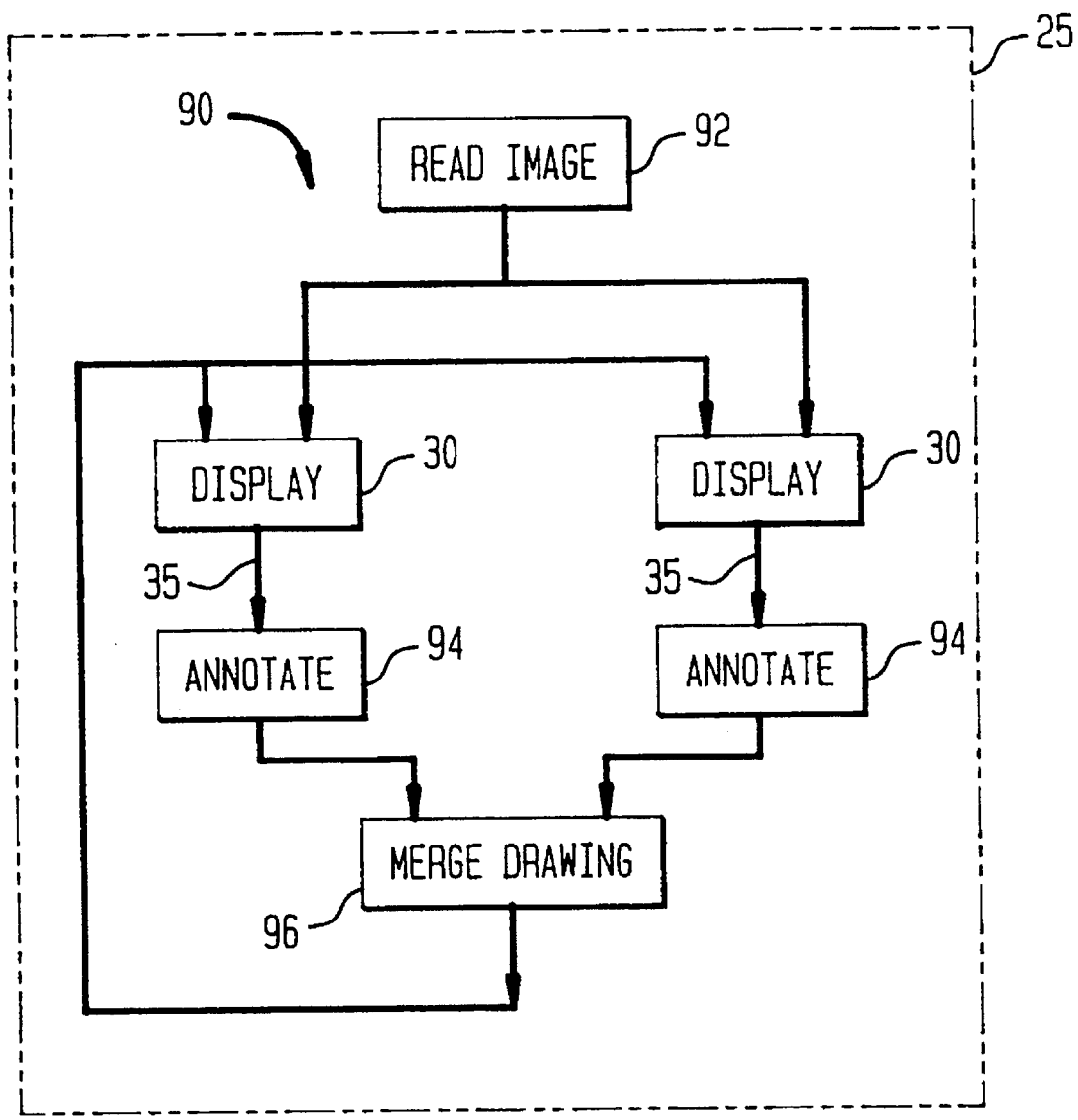
FIG. 11 is a diagram of a basic tele-collaboration network of the invention.

FIG. 11 illustrates a basic tele-collaboration network 90 in accordance with the invention. An image is read from a module 92 and thereafter forwarded to display modules 30 for display in two separate windows, preferably on different displays 20 across a computer network. Mouse movements from the windows are forwarded, via feedback channels 35, to annotating modules 94, which translate these movements into sequences of differently colored line drawing commands. The drawing commands from the windows are then merged at merge drawing module 96 and sent back to display modules 30 where the lines are overlaid on the images on the windows. The resulting annotations are displayed on both windows. Since the display modules 30 adapt to the frame buffer qualities of each display screen 25, the same image can be viewed at different quality levels, e.g., on a high resolution device in a medical operating room and on a lower resolution screen of a home computer. This technique is particularly advantageous for tele-medicine applications wherein a surgeon needs to consult with a radiologist to outline the location of a tumor on an X-ray image.

While there has been shown and described a preferred embodiment, it is to be understood that various other adaptations may be made within the spirit and scope of the invention. It will therefore be apparent that variations and modifications in the specifically described embodiments can be carried out without departing from the scope of the invention which is to be limited only by the scope of the appended claims.

What is claimed is:

1. A method for enhancing user interaction with an output image displayed on a computer screen, said output image having been derived by means of at least one transformation of a source image, said method comprising the steps of:

constructing a dataflow network comprising a plurality of interconnected icons on the screen, said icons representing executable software modules including a first module for acquiring said source image, a second module for applying a transformation to said source image and a third module for displaying said output image;

executing said modules to display said output image on the screen;

providing user parameters to said third module through cursor positioning events to relative to said displayed output image;

transferring said user parameters from said third module directly to said second module; and modifying said source image by said second module in response to said transferred user parameters so as to provide a corresponding modification to said displayed output image, thereby enhancing user interaction with said output image.

2. The method of claim 1 further comprising the step of:

providing state information to each of said modules, said state information relating to descriptions of said source image and to the transformation applied to said source image.

3. The method of claim 2 wherein said modifying step comprises the steps of:

inverting the transformation applied to said source image;

relating said user parameters to said source image;

applying the transformation to said source image; and executing said modules to display said output image.

4. Apparatus for enhancing user interaction with an output image displayed on a screen of a computer, said output image having been derived by means of at least one transformation of a source image, said apparatus comprising:

means for constructing a data flow network comprising a plurality of interconnected icons on the screen, said icons representing executable software modules including a first module for acquiring said source image, a second module for applying a transformation to said source image, a third module for interactively displaying said output image;

means for executing said modules to display said output image on the screen;

first means for providing user parameters to said third module through cursor positioning events relative to said displayed output image;

a feedback channel connecting an output port of said third module to an input port of said second module;

means for transferring said user parameters from said output port of said third module directly to only said input port of said second module; and means for modifying said source image by said second module in response to said transferred user parameters so as to provide a corresponding modification to said displayed output image, thereby enhancing user interaction with said output image.

5. The apparatus of claim 4, wherein said modifying means further comprises:

means for inverting the transformation applied to said source image;

means for relating said user parameters to said source image;

means for applying the transformation to said user-related source image; and means for executing said modules to display said user-related output image.

6. The apparatus of claim 4 further comprising:

second means for storing state information, said state information including descriptions of said data elements and said transformation applied to said data elements.

7. The apparatus of claim 6 wherein said second providing means comprises;

a logbook record structure resident in a memory of said computer, said logbook record structure including a plurality of fields containing said state information, and further wherein said modules access said state information in a decentralized manner.

8. The apparatus of claim 7 wherein one of said plurality of fields contains vectors for storing cropping information and subsampling information for multi-dimensional arrays.

9. The apparatus of claim 8 wherein said one of said plurality of fields further contains vectors for storing physical lengths and virtual lengths of a dimension.

10. The apparatus of claim 9 wherein said source image is a digital representation of said output image.

11. The apparatus of claim 10 wherein said digital representation comprises:

a matrix of pixel data elements, wherein each said pixel data element is defined by a plurality of dimensions.

12. The apparatus of claim 11 wherein said cursor positioning events are implemented by a mouse device.

13. The apparatus of claim 11 wherein another of said plurality of fields contains a first homogeneous matrix for projecting three-dimensional pixel data to two-dimensions and a second homogeneous matrix for transforming two-dimensional pixel data.

14. The apparatus of claim 13 wherein yet another of said plurality of fields contains a plurality of variables describing an $x\_$ position of said mouse device and a $y\_$ position of said mouse device.

15. Apparatus for enhancing user interaction with an output image displayed on a screen of a computer, said output image having been derived by means of at least one transformation of a source image, said apparatus comprising:

means for constructing a dataflow network comprising a plurality of interconnected icons on the screen, said icons representing executable software modules including a first module for acquiring said source image, a second module for applying a transformation to said source image, a third module for interactively displaying said output image and a feedback channel connecting an output port of said third module to an input port of said second module;

means for executing said modules to display said output image on the screen;

means for providing user parameters to said third module through cursor positioning events relative to said displayed output image;

means for transferring said user parameters from an output port of said third module directly to an input port of said second module via said feedback channel;

a logbook record structure resident in a memory of said computer, said logbook record structure including a plurality of fields configured to store state information, said state information including descriptions of said data elements and said transformation applied to said data elements, wherein said modules access said state information in a decentralized manner; and means for modifying said source image in response to said transferred user parameters so as to provide a corresponding modification to said displayed output image, thereby enhancing user interaction with said output image.

16. Apparatus for enhancing user interaction with an output image displayed on a screen of a computer, said output image having been derived by means of at least one transformation of a source image, said apparatus comprising:

means for constructing a dataflow network comprising a plurality of interconnected icons on the screen, said icons representing executable software modules including a first module for acquiring said source image, a second module for applying a transformation to said source image, a third module for interactively displaying said output image;

means for executing said modules to display said output image on the screen;

first means for providing user parameters to said third module through cursor positioning events relative to said displayed output image;

means for transferring said user parameters from an output port of said third module to an input port of said second module via a feedback channel;

a logbook record structure resident in a memory of said computer, said logbook record structure including a plurality of fields containing state information, said state information including descriptions of said data elements and said transformation applied to said data elements; and means for modifying said source image in response to said transferred user parameters so as to provide a corresponding modification to said displayed output image, thereby enhancing user interaction with said output image.

17. The apparatus of claim 16, wherein said transferring means comprises a feedback channel connecting said output port of said third module to said input port of said second module.

\* \* \* \* \*